(12) United States Patent
Bexten et al.

(10) Patent No.: US 7,634,848 B2
(45) Date of Patent: Dec. 22, 2009

(54) METHOD FOR RETAINING AND POSITIONING A SHAFT IN A MACHINE

(75) Inventors: Dan Bexten, Kalispell, MT (US); Dan Potter, Bozeman, MT (US)

(73) Assignee: Robert C. Burgi, Columbia Falls, MT (US)

( * ) Notice: Subject to any disclaimer, the term of this patent is extended or adjusted under 35 U.S.C. 154(b) by 129 days.

(21) Appl. No.: 11/130,055

(22) Filed: May 16, 2005

(65) Prior Publication Data

US 2006/0257202 A1 Nov. 16, 2006

(51) Int. Cl.
*B23P 11/00* (2006.01)
*F16B 9/00* (2006.01)

(52) U.S. Cl. ............... 29/525.01; 29/525.13; 403/230; 403/263

(58) Field of Classification Search ............... 29/525.01, 29/525.02, 525.03, 525.11, 525.12, 525.13, 29/893, 893.1, 893.2, 893.3, 893.31; 248/637, 248/638, 639, 674, 680, 205.1; 403/83, 165, 403/167, 168, 230, 241, 263, 111
See application file for complete search history.

(56) References Cited

U.S. PATENT DOCUMENTS

| 1,262,370 | A | * | 4/1918 | Mead | 403/230 |
| 1,609,118 | A | * | 11/1926 | Hardy | 403/168 |
| 3,047,318 | A | * | 7/1962 | Berkshire | 403/83 |
| 3,932,047 | A | * | 1/1976 | Crossan | 403/186 |
| 5,816,732 | A | * | 10/1998 | Nissen | 403/327 |
| 5,839,703 | A | * | 11/1998 | Tesar | 248/65 |
| 6,098,263 | A | * | 8/2000 | Subler et al. | 29/446 |
| 7,040,835 | B2 | * | 5/2006 | Sun | 403/383 |
| 7,146,704 | B2 | * | 12/2006 | Otten et al. | 29/525.01 |
| 2003/0014855 | A1 | * | 1/2003 | Guzzoni | 29/525.01 |

\* cited by examiner

*Primary Examiner*—Jermie E Cozart
(74) *Attorney, Agent, or Firm*—Thomas F. Lebens; Fitch, Even, Tabin & Flannery

(57) ABSTRACT

A shaft retainer includes a plate having a slot extending from an edge of the plate for engaging a radial groove formed in a shaft and a fastening device for fastening the plate to a structure to prevent axial movement of the shaft relative to the structure.

15 Claims, 5 Drawing Sheets

METHOD FOR RETAINING AND POSITIONING A SHAFT IN A MACHINE

BACKGROUND OF THE INVENTION

1. Field of the Invention

The method and apparatus for retaining and positioning a shaft in a machine disclosed herein is directed to the assembly and installation of devices having a shaft supported by an internal bearing. More specifically, but without limitation thereto, this method is directed to the installation of an electric motor coupled to a traction machine that absorbs a heavy axial load.

2. Description of Related Art

Electric motors are often coupled to worm gear boxes to power elevators and traction machines. Mechanical power is delivered from the motor to the gear box by a rotating shaft that is supported by bearings or bushings inside the motor. The motor shaft is coupled to a worm shaft that extends from the worm gear box. The worm shaft typically experiences high axial thrust forces that are transmitted through needle thrust bearings to a massive housing enclosing the worm gear box that is capable of supporting the axial load. The electric motor generally includes a ball bearing or a bushing at one or both ends of the motor shaft to bear radial forces.

SUMMARY OF THE INVENTION

In one embodiment, a shaft retainer includes a plate having a slot extending from an edge of the plate for engaging a radial groove formed in a shaft and a fastening device for fastening the plate to a structure to prevent axial movement of the shaft relative to the structure.

In another embodiment, a method includes steps of:
  providing a shaft;
  engaging a radial groove formed in the shaft with a plate having a slot extending from an edge of the plate; and
  fastening the plate to a structure with a fastening device to prevent axial movement of the shaft relative to the structure.

In a further embodiment, a method of installing an electric motor in a traction machine includes steps of:
  providing an electric motor and a traction machine;
  inserting a shaft retainer having a plate and a slot extending from an edge of the plate into a radial groove formed in a shaft extending from the motor;
  fastening the shaft retainer to the motor to prevent axial movement of the shaft relative to the motor and to position the shaft to accommodate endplay from the traction machine;
  shipping the motor to the traction machine;
  coupling the motor to the traction machine; and
  removing the shaft retainer from the shaft.

BRIEF DESCRIPTION OF THE DRAWINGS

The above and other aspects, features and advantages will become more apparent from the description in conjunction with the following drawings presented by way of example and not limitation, wherein like references indicate similar elements throughout the several views of the drawings.

Elements in the figures are illustrated for simplicity and clarity and have not necessarily been drawn to scale. For example, the dimensions, sizing, and/or relative placement of some of the elements in the figures may be exaggerated relative to other elements to clarify distinctive features of the illustrated embodiments. Also, common but well-understood elements that are useful or necessary in a commercially feasible embodiment are often not depicted in order to facilitate a less obstructed view of the illustrated embodiments.

DESCRIPTION OF THE ILLUSTRATED EMBODIMENTS

The following description is not to be taken in a limiting sense, rather for the purpose of describing by specific examples the general principles that are incorporated into the illustrated embodiments. For example, certain actions or steps may be described or depicted in a specific order of occurrence, however, practitioners of the art will understand that the specific order is not a requirement. Also, the terms and expressions used in the description have the ordinary meanings accorded to such terms and expressions in the corresponding respective areas of inquiry and study except where other meanings have been specifically set forth herein.

A common problem encountered in coupling an electric motor to a worm gear box is that the motor shaft and the worm shaft must be precisely aligned coaxially to prevent radial binding and/or vibration that may be detrimental to bearing life in the motor and the worm gear box. Worm gear boxes may also have significant endplay, possibly a centimeter or more. The endplay must be accommodated by providing sufficient axial clearance in the motor to avoid transferring the axial load to the motor bearings that could lead to premature bearing failure.

A flexible coupling may be used between the motor shaft and the worm shaft to relieve radial misalignment and axial thrust, however, flexible couplings may introduce other disadvantages such as increased cost and loss of torsional rigidity. Another solution to the problem of bearing misalignment is to have only one bearing in the motor to support the motor shaft on the end of the motor that is farthest from the worm gear box. Although there is still a possibility of misalignment, any radial misalignment is mitigated by the longer axial distance between the shaft coupling and the motor bearing. Also, small angular misalignments may be more readily accommodated by flexure in the shaft, the bearings, and the shaft coupling.

Figure 1:
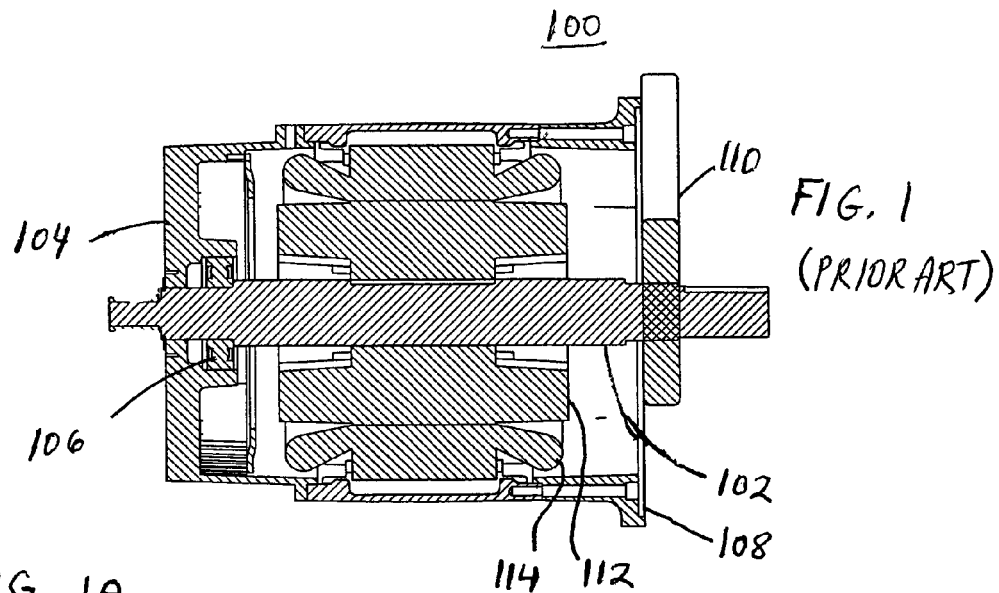
FIG. 1 illustrates a cross-sectional view of an electric motor of the prior art.

FIG. 1 illustrates a cross-sectional view of single bearing electric motor 100 of the prior art. Shown in FIG. 1 are a motor shaft 102, an end bell 104, a bearing 106, a mounting flange 108, a shipping support 110, an armature 112, and a stator 114.

In FIG. 1, the end bell 104 and the bearing 106 constitute the supporting structure for the motor shaft 102. The bearing 106 is typically press fit to the motor shaft 102 and is a slip fit inside the end bell 104. The shipping support 110 holds the front end of the motor shaft 102 in axial and radial alignment during shipping. The mounting flange 108 is used to hold the motor 100 on a traction machine or other device to which mechanical power is to be delivered by the motor 100. The armature 112 rotates with the motor shaft 102 against the magnetic field of the stator 114 to transform electrical power from the armature 112 and the stator 114 into mechanical power.

A disadvantage of the single bearing motor 100 of FIG. 1 is the possibility that the motor shaft 102 may slip out of the end bell 104 and out of the motor 100 during handling or installation of the motor 100 after the shipping support 110 is removed. As a result, there may be damage to the motor 100 and/or injury to installation personnel. Also, a critical step in the procedure of installing the motor 100 in the traction machine is the axial positioning of the motor shaft 102 to provide sufficient endplay to avoid bottoming out of the motor bearing 106 in the end bell 104 and to prevent the motor bearing 106 from slipping out of the end bell 104. Consequently, personnel installing the motor 100 must make a careful measurement and adjustment of the position of the motor shaft 102 when the motor shaft 102 is coupled to the traction machine.

Figure 1A:
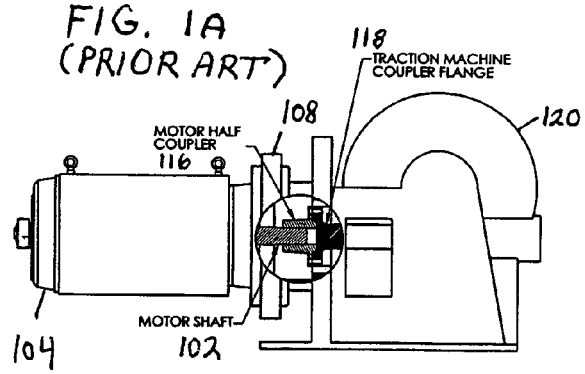
FIG. 1A illustrates a side view of the motor of FIG. 1 of the prior art coupled to a traction machine.

FIG. 1A illustrates a side view of the motor 100 of FIG. 1 of the prior art coupled to a traction machine. Shown in FIG. 1A are a motor shaft 102, an end bell 104, a mounting flange 108, a motor half coupler 116, a traction machine coupler flange 118, and a traction machine 120.

In FIG. 1A, the mounting flange 108 is used to mount the motor 100 on the traction machine 120. The motor half-coupler 116 is fastened to the motor shaft 102 and to the traction machine coupler flange 118. The traction machine coupler flange 118 is fastened to the worm shaft of the traction machine 120.

Typically, the motor installer measures the axial endplay between the extreme positions of the worm shaft relative to the mounting flange 108 and then calculates an axial position on the motor shaft 102 to fasten the motor half-coupler 116 to the motor shaft 102 so that the motor shaft travel between the extreme positions of the worm shaft is centered in the middle of the end bell 104. This step ensures that the motor shaft 102 and the motor bearing 106 will not slip out of the end bell 104 at one extreme position of the worm shaft and that the motor bearing 106 will not bottom out inside the end bell 104 at the other extreme position of the worm shaft. Disadvantageously, requiring the installer to measure the axial endplay increases the likelihood of human error and the expense of training installer personnel.

A device that overcomes the disadvantages of coupling the single bearing motor 100 of FIG. 1 to a worm shaft in a traction machine is described as follows.

In one embodiment, a shaft retainer includes:

a plate having a slot extending from an edge of the plate for engaging a radial groove formed in a shaft; and a fastening device for fastening the plate to a structure to prevent axial movement of the shaft relative to the structure.

Figure 2:
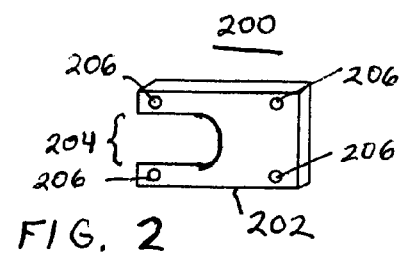
FIG. 2 illustrates a shaft retainer for the motor of FIG. 1.

FIG. 2 illustrates a shaft retainer 200 for the motor 100 of FIG. 1. Shown in FIG. 2 are a plate 202, a slot 204, and mounting holes 206.

In FIG. 2, the plate 202 is preferably made of a material that is strong enough to support the weight of the motor shaft 102 during shipping and installation. In one variation, the material is not so strong as to result in damage to the motor 100 if the shaft retainer 200 is accidentally left in place. For example, the plate 202 may be made of a suitable thickness of light metal such as aluminum or a plastic. Alternatively, the plate 202 may be made of a stronger metal, such as steel. The slot 204 extends from the edge of the plate 202 by a distance that is sufficient to engage a groove that is formed in the motor shaft 102 as a modification to the motor 100. The mounting holes 206 are used to fasten the plate 202 to the end bell 104 of the motor 100.

Figure 3:
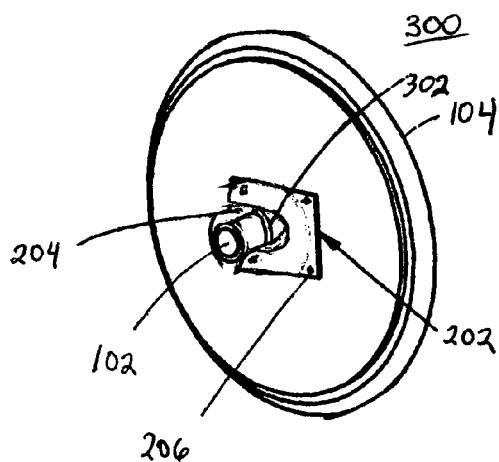
FIG. 3 illustrates the shaft retainer of FIG. 2 mounted on the end bell of the motor of FIG. 1 for shipping and installation.

FIG. 3 illustrates a perspective view 300 of the shaft retainer 200 of FIG. 2 mounted on the end bell 104 of the motor 100 of FIG. 1 for shipping and installation. Shown in FIG. 3 are a motor shaft 102, an end bell 104, a plate 202, a slot 204, mounting holes 206, and a motor shaft groove 302.

In FIG. 3, the slot 204 in the plate 202 has a width that is preferably less than the diameter of the motor shaft 102 and a thickness that preferably provides a slip fit in the motor shaft groove 302. The plate 202 is fastened to the end bell 104, for example, by screws through the mounting holes 206.

The motor shaft groove 302 is formed in the motor shaft 102 at the factory determined distance from the bearing 106 that provides the desired amount of endplay inside the end bell 104. When the shaft retainer 200 is inserted in the motor shaft groove 302 and is fastened to the end bell 104, the motor shaft 102 is held in axial alignment with the end bell 104 so that the motor shaft 102 cannot slip out of the end bell 104 when the shipping support 110 is removed. Also, the motor shaft 102 is precisely positioned at precisely the axial location that provides the desired endplay in the end bell 104, advantageously avoiding the possibility of human error in setting the axial alignment of the motor shaft 102 during installation of the motor 100.

Figure 4:
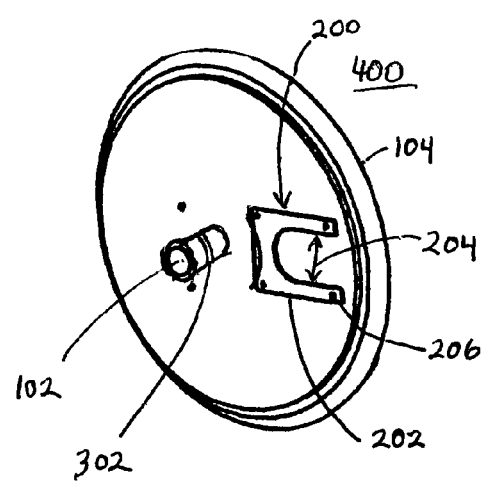
FIG. 4 illustrates a perspective view of the shaft retainer of FIG. 2 and the motor of FIG. 1 in the installed and operating position.

FIG. 4 illustrates a perspective view 400 of the shaft retainer 200 of FIG. 2 and the motor 100 of FIG. 1 in the installed and operating position. Shown in FIG. 4 are a motor shaft 102, an end bell 104, a plate 202, a slot 204, mounting holes 206, and a motor shaft groove 302.

In FIG. 4, the U-shaped shaft retainer 200 is removed so that it no longer engages the motor shaft groove 302 and is re-fastened by the mounting holes 206 to the end bell 104 for use in later removal of the motor 100. For example, if the motor 100 needs to be replaced, the shaft retainer 200 may be re-fastened to the end bell 104 as shown in FIG. 3 to hold the motor shaft 102 in axial alignment with the end bell 104 so that the motor shaft 102 and the motor bearing 106 cannot slip out of the end bell 104.

Figure 5:
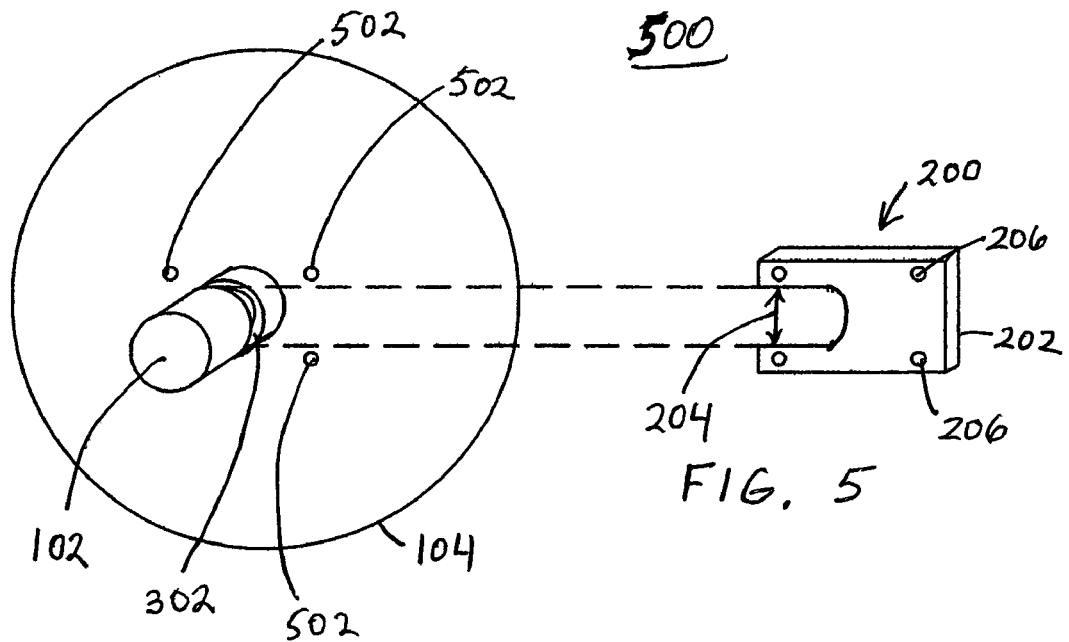
FIG. 5 illustrates an exploded view of the shaft retainer of FIG. 2 and the end bell of the motor of FIG. 1.

FIG. 5 illustrates an exploded view 500 of the shaft retainer 200 of FIG. 2 and the end bell 104 of the motor 100 of FIG. 1. Also shown in FIG. 5 are a motor shaft 102, an end bell 104, a plate 202, a slot 204, mounting holes 206, a motor shaft groove 302, and threaded holes 502.

In FIG. 5, the motor shaft 102 extends through the bearing 106 and outside the end bell 104. The slot 204 in the plate 202 fits in the motor shaft groove 302 to hold the motor shaft 102 in axial alignment so that the motor shaft 102 cannot slip out of the end bell 104. The plate 202 may be secured to the end bell 104, for example, by screws fastened through the mounting holes 206 into the threaded holes 502 in the end bell 104.

Figure 6:
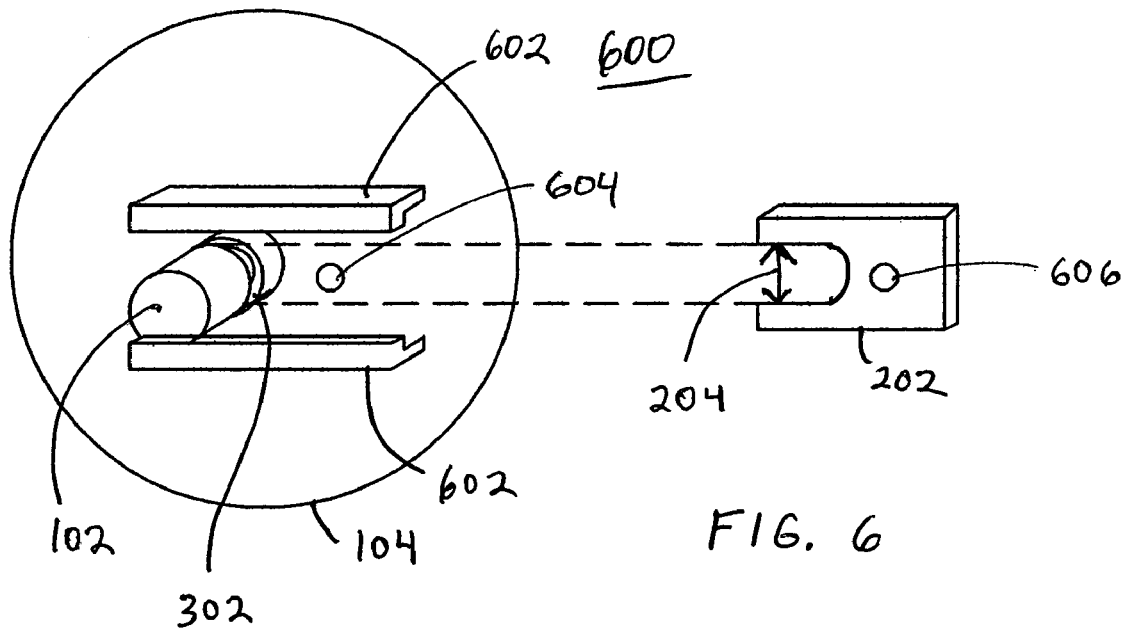
FIG. 6 illustrates an exploded view of a shaft retainer for fastening to the end bell of the motor of FIG. 1 with mounting rails and a catch.

Alternatively, other means may be used to fasten the plate 202 to the end bell 104, for example, as shown in FIG. 6.

FIG. 6 illustrates an exploded view 600 of a shaft retainer for fastening to the end bell of the motor of FIG. 1 with mounting rails and a catch. Shown in FIG. 6 are a motor shaft 102, an end bell 104, a plate 202, a slot 204, a motor shaft groove 302, rails 602, a catch 604, and a catch mating feature 606.

In FIG. 6, the rails 602 may be formed in the end bell 104, for example, according to well known techniques of die casting. The plate 202 slides between the rails 602 until the slot 204 engages the sides of the motor shaft groove 302. The catch 604, may be, for example, a threaded hole and the catch mating feature 606 may be a hole in the plate 202 for receiving a screw to prevent the plate 202 from slipping out from between the rails 602. After the motor 100 has been installed, the shaft retainer 200 may be inserted backwards between the rails 602 so that the slot 204 faces away from the motor shaft 102 as shown in FIG. 4 and may be fastened to the end bell 104 by the catch 604 and the catch mating feature 606 until needed to replace the motor 100.

An advantage of the arrangement of FIG. 6 is that the four screws of FIG. 5 are no longer needed to fasten the shaft retainer 200 to the end bell 104, thereby reducing the installation time. Other means may be used to implement the catch 604 and the catch mating feature 606 with or without a screw according to well known mechanical fastening techniques.

Figure 7:
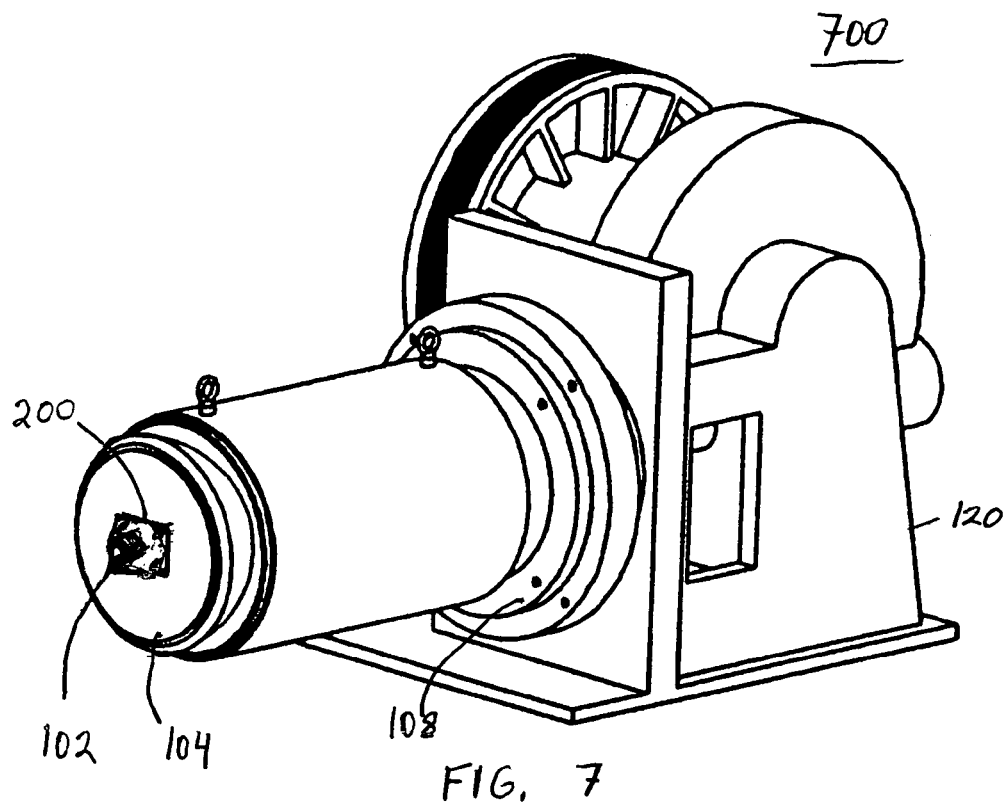
FIG. 7 illustrates a perspective view of the motor of FIG. 1 and the shaft retainer of FIG. 2 during installation of the motor in a traction machine.

FIG. 7 illustrates a perspective view 700 of the motor 100 of FIG. 1 and the shaft retainer 200 of FIG. 2 during installation in a traction machine 120. Shown in FIG. 7 are a motor shaft 102, an end bell 104, a mounting flange 108, and a traction machine 120.

In FIG. 7, the shaft retainer 200 is fastened to the end bell 104 in the shipping and installation configuration. The shaft retainer 200 positions the motor shaft 102 in the correct alignment for accommodating the endplay from the worm shaft in the traction machine 120 and prevents the motor shaft 102 from slipping out of the motor 100 while the motor 100 is being fastened to the traction machine 120 by the mounting flange 108.

While the example above is directed to an electric motor coupled to a traction machine, the shaft retainer 200 is generally applicable to any driving device that is coupled to a driven device by a rotating shaft in which it is desirable to limit axial movement and to fix the axial position of the shaft relative to the driving device.

Figure 8:
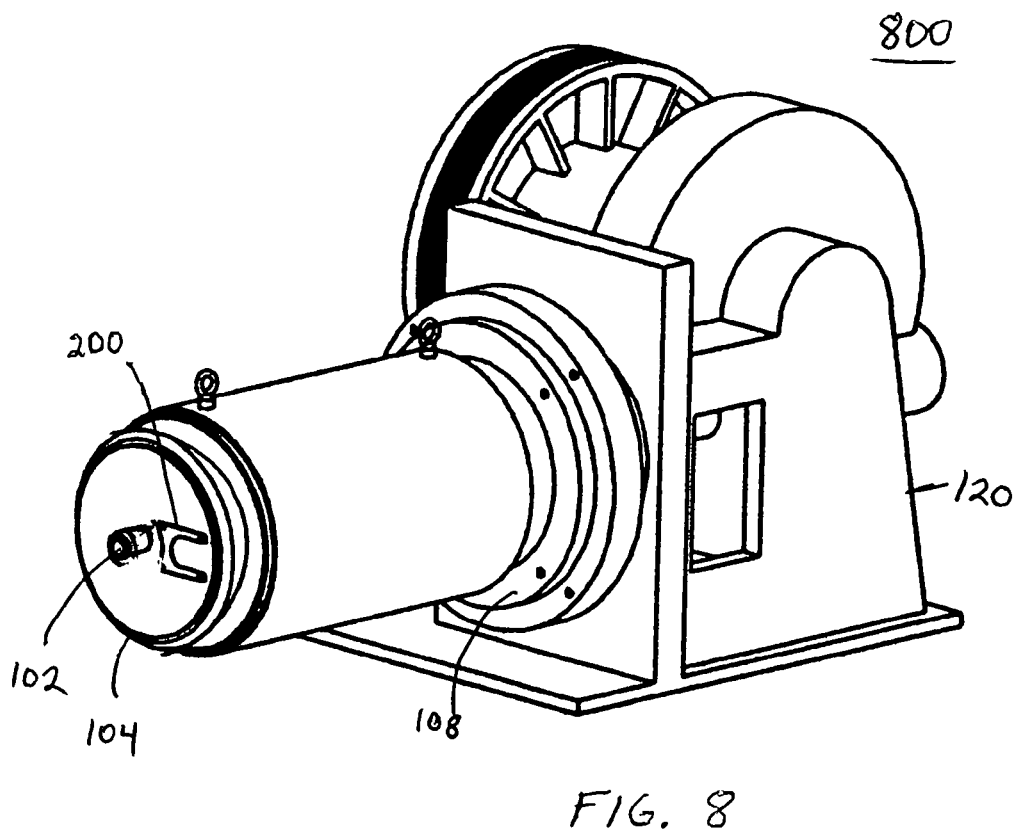
FIG. 8 illustrates a perspective view of the motor of FIG. 1 and the shaft retainer of FIG. 2 after installation of the motor in a traction machine.

FIG. 8 illustrates a perspective view 800 of the motor 100 of FIG. 1 and the shaft retainer 200 of FIG. 2 after installation in a traction machine 120. Also shown in FIG. 8 are a motor shaft 102, an end bell 104, a mounting flange 108, and a traction machine 120.

In FIG. 8, the shaft retainer 200 is fastened to the end bell 104 in the installed and operating position to store the shaft retainer 200 until needed to replace the motor 100.

In another embodiment, a method includes steps of:
providing a shaft;
engaging a radial groove formed in the shaft with a plate having a slot extending from an edge of the plate; and
fastening the plate to a structure with a fastening device to prevent axial movement of the shaft relative to a structure. The structure may be, for example, the end bell of an electric motor.

Figure 9:
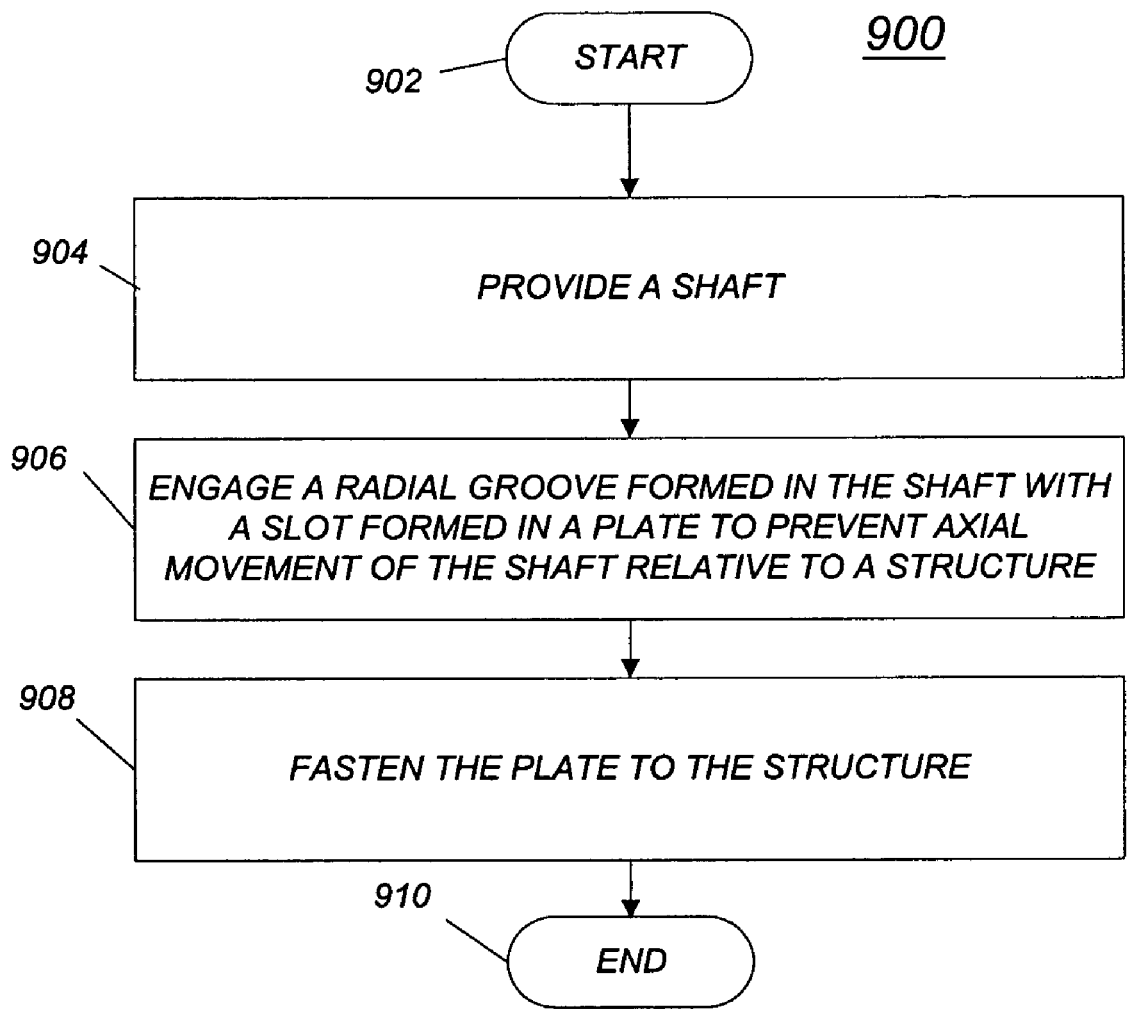
FIG. 9 illustrates a flow chart for a method of retaining and positioning a shaft.

FIG. 9 illustrates a flow chart for a method of retaining and positioning a shaft in a machine.

Step 902 is the entry point of the flow chart 900.

In step 904, a shaft is provided. For example, the shaft may be the armature shaft of an electric motor, and the structure may be a bearing that fits over the shaft and an end bell of the electric motor that supports the bearing.

In step 906, a radial groove formed in the shaft is engaged by a plate having a slot extending from an edge of the plate. The slot preferably has a width that is less than the diameter of the shaft and a thickness that provides a slip fit between the sides of the radial groove in the shaft. The radial groove is preferably formed in the shaft at a predetermined location that precisely positions the shaft to accommodate endplay from a load.

In step 908, the plate is fastened to the structure with a fastening device to prevent axial movement of the shaft relative to the structure. For example, the plate may be fastened to the outside of the end bell of an electric motor by one or more mounting screws. Alternatively, the plate may be fastened by rails and a catch to lock the plate between the rails.

Step 910 is the exit point of the flow chart 900.

In a further embodiment, a method of installing a motor in a traction machine includes steps of:
providing a motor;
inserting a shaft retainer having a plate and a slot extending from an edge of the plate into a radial groove of a shaft extending from the motor;
fastening the shaft retainer to the motor to prevent axial movement of the shaft relative to the motor and to position the shaft axially relative to the motor to accommodate endplay from the traction machine;
shipping the motor to the traction machine;
fastening the motor to the traction machine; and
removing the shaft retainer from the shaft.

Figure 10:
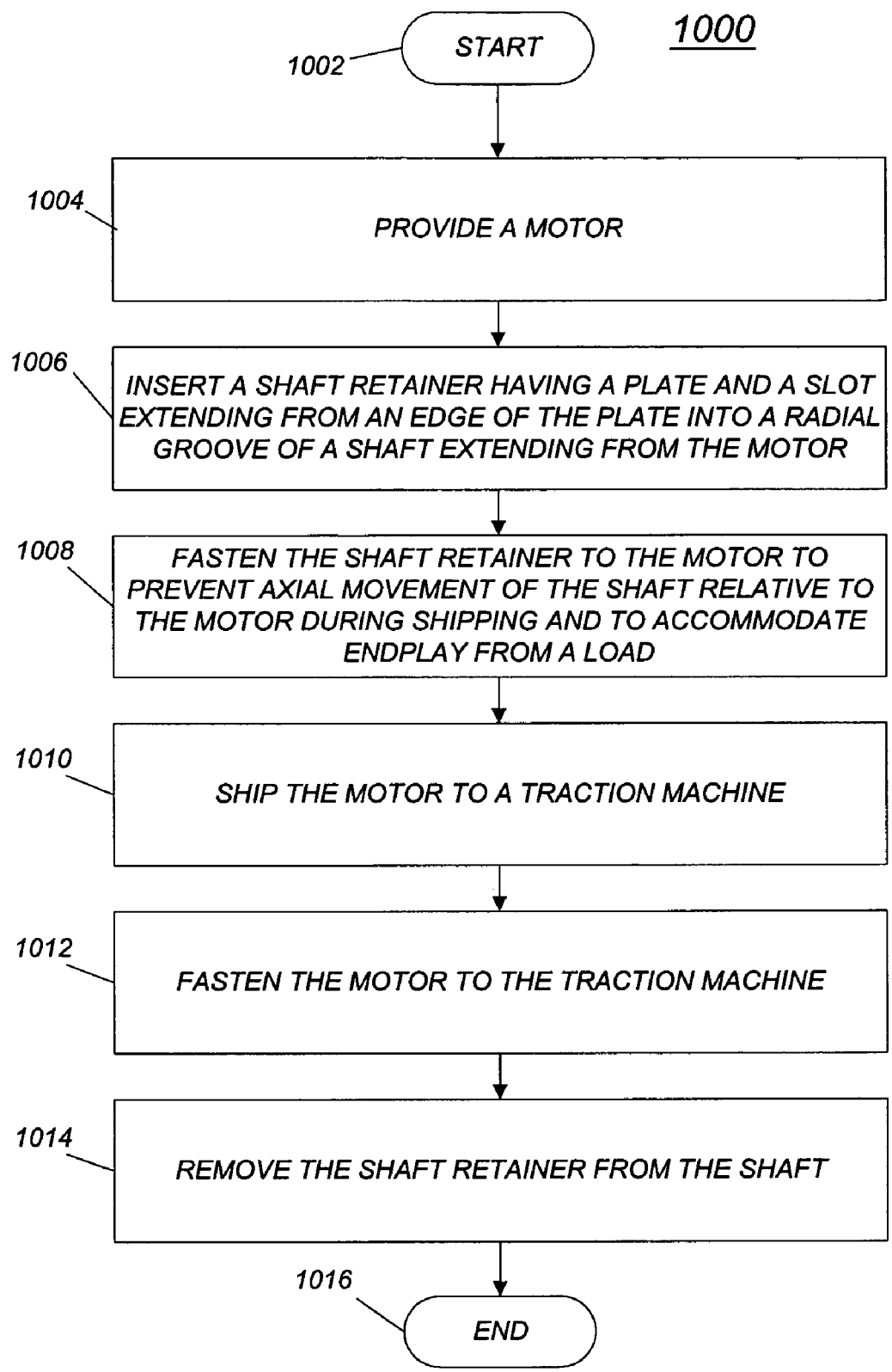
FIG. 10 illustrates a flow chart for a method of installing a motor in a traction machine.

FIG. 10 illustrates a flow chart for a method of installing a motor in a traction machine. Step 1002 is the entry point of the flow chart 1000.

In step 1004, a motor is provided. The motor may be an electric motor or any other type of motor suitable for driving a load such as a traction machine.

In step 1006, a shaft retainer having a plate and a slot extending from an edge of the plate is inserted into a radial groove of a shaft extending from the motor as described above.

In step 1008, the shaft retainer is fastened to the motor to prevent axial movement of the shaft relative to the motor during shipping and to position the shaft, for example, to accommodate endplay from the load as described above.

In step 1010, the electric motor is shipped to a traction machine. Typically, the traction machine is part of a structure such as an elevator.

In step 1012, the motor is fastened to the traction machine. The shaft retainer precisely positions the shaft to accommodate the endplay from the traction machine while the motor is being fastened to the traction machine during installation.

In step 1014, the shaft retainer is removed from the shaft.

Step 1016 is the exit point of the flow chart 1000.

Although the flowchart descriptions above are described and shown with reference to specific steps performed in a specific order, these steps may be combined, sub-divided, or reordered without departing from the scope of the claims. Unless specifically indicated, the order and grouping of steps is not a limitation of other embodiments that may lie within the scope of the claims.

The shaft retainer described above not only prevents axial movement of a motor shaft during shipping, but also provides precise axial positioning of the motor shaft to accommodate endplay from the load, thereby avoiding the possibility of human error in setting the axial alignment of the motor shaft during installation of the motor.

The specific embodiments and applications thereof described above are for illustrative purposes only and do not preclude modifications, combinations, and variations that may be made within the scope of the following claims.

What is claimed is:

1. A method comprising steps of:
providing a shaft;
engaging a circumferential groove formed in the shaft and extending around a circumference of the shaft with a plate having a slot extending from an edge of the plate; and
fastening the plate to a structure with a fastening device to prevent axial movement of the shaft relative to the structure, wherein the fastening device comprises a pair of side rails and a catch formed in the structure.

2. The method of claim 1 wherein the plate is made of a metal.

3. The method of claim 2 wherein the plate is made of aluminum or steel.

4. The method of claim 1 wherein the plate is made of a plastic.

5. The method of claim 1 wherein the slot has a width that is less than a diameter of the shaft.

6. The method of claim 5 wherein the plate has a thickness that is less than a width of the groove formed in the shaft.

7. The method of claim 1 wherein the fastening device comprises an opening formed in the plate.

8. The method of claim 7 wherein the opening has a diameter for receiving a screw to hold the plate on the structure.

9. The method of claim 1 wherein the structure comprises an end bell of an electric motor.

10. A method of installing a motor in a traction machine comprising steps of:
providing a motor;
inserting a shaft retainer having a plate and a slot extending from an edge of the plate into a radial groove of a shaft extending from the motor;
fastening the shaft retainer to the motor to prevent axial movement of the shaft relative to the motor and to position the shaft axially relative to the motor;
shipping the motor to the traction machine;
fastening the motor to the traction machine; and
removing the shaft retainer from the shaft.

11. The method of claim 10 further comprising forming the radial groove in the shaft at a predetermined location to position the shaft axially relative to the structure.

12. A method for retaining and positioning a motor shaft in a machine comprising steps of:
providing the motor shaft in the machine, including a feature for engaging a fastener;
engaging the feature with the fastener; and
securing the fastener to a structure to prevent axial movement of the shaft relative to the structure, wherein the fastener comprises a pair of side rails and a catch formed in the structure.

13. The method of claim 12 wherein the feature is a radial groove.

14. The method of claim 12 wherein the securing of the fastener to the structure comprises securing the fastener to a plate.

15. The method of claim 12 wherein the plate is made of a metal.

* * * * *

UNITED STATES PATENT AND TRADEMARK OFFICE
CERTIFICATE OF CORRECTION

PATENT NO. : 7,634,848 B2 Page 1 of 1
APPLICATION NO. : 11/130055
DATED : December 22, 2009
INVENTOR(S) : Bexten et al.

It is certified that error appears in the above-identified patent and that said Letters Patent is hereby corrected as shown below:

On the FACE PAGE:
   (74) Attorney, Agent, or Firm – please delete "Fitch, Even, Tabin & Flannery" and insert
--Sinsheimer Juhnke Lebens & McIvor, LLP--.

Signed and Sealed this

Thirteenth Day of April, 2010

David J. Kappos
*Director of the United States Patent and Trademark Office*